United States Patent Office 3,294,812
Patented Dec. 27, 1966

3,294,812
CERTAIN NAPHTHOTRIAZOLE AND NAPHTHO-
THIADIAZOLE COMPOUNDS
William Lindsay Mosby, North Plainfield, N.J., assignor to American Cyanamid Company, Stamford, Conn., a corporation of Maine
No Drawing. Filed June 16, 1965, Ser. No. 464,582
5 Claims. (Cl. 260—304)

This invention relates to, and has for its object, the provision of a new class of compounds. More particularly, it relates to diacylates of naphthotriazole-diols and naphthothiadiazole-diols represented by the following Formula I:

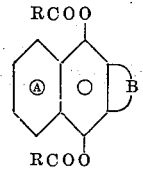

wherein R is lower alkyl, ring A may have lower alkyl, lower alkoxy, nitro, halo or lower alkanamido substituents and B is a radical of the following group:

(1)  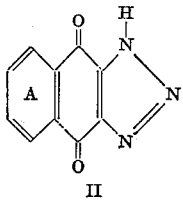

(2)  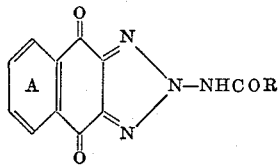

and (3)  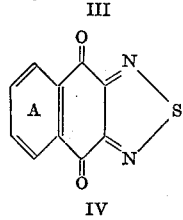

The compounds of this invention are prepared by reductive-acylation of quinone starting materials.

The starting quinones are of the following general Formulae II–IV:

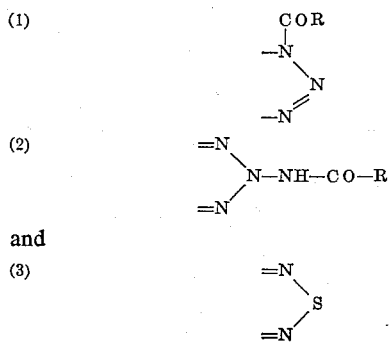

In Formulas II–IV, ring A can be substituted by lower alkyl, lower alkoxy, halogen (e.g., chloro), nitro or lower alkanamido. Any reactive hydrogen, such as the hydrogen on the ring nitrogen in Formula II, or the hydrogen of an amino group, will be acylated in the reductive-acylation reaction. Also, a nitro group is reducible (to an acylamido group).

The general procedure for the reductive-acylation is to react the quinone dissolved in an anhydride of a lower alkanoic acid with zinc dust. Elevated temperatures are normally used. The products are isolated by triturating the reaction mixture with water, filtering off the product, and, if desired, purifying the product as by crystallization from a suitable solvent.

The products are yellow to orange crystalline solids, which are useful as fluorescent pigments.

The following examples, in which parts and percentages are by weight, are presented to illustrate the present invention.

Example 1.—1-acetyl-1H-naphtho[2,3-d]triazole-4,9-diol diacetate

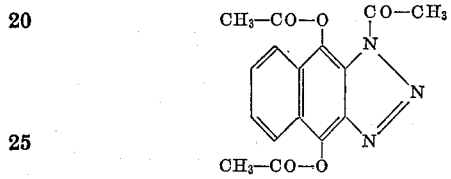

Zinc dust is added to a boiling solution of 1.60 parts of 1H-naphtho[2,3-d]triazole-4,9-dione in 7.0 parts of acetic anhydride, one part of pyridine and a trace amount of sulfuric acid. The resulting mixture is cooled and triturated with water. The precipitate is separated by filtration, washed with water, methanol, ethyl acetate and ligroin and then recrystallized from methylcyclohexane. After final crystallization from methanol, the product, pale yellow, needle-like crystals, melts at 168.8–169.5° C.

Example 2.—2-acetamido-2H-naphtho[2,3-d]triazole-4,9-diol diacetate

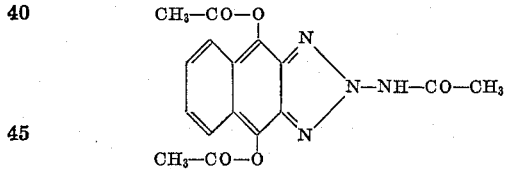

The procedure of Example 1 is followed substituting 2-acetamido-2H-naphtho[2,3-d]triazole-4,9-dione for the 1H-naphtho[2,3-d]triazole-4,9-dione. The product, recrystallized from ethyl acetate, melts at 229.5–231.5° C. (decomposition).

The 2-acetamido-2H-naphtho[2,3-d]triazole-4,9-dione is obtained by reacting 2-amino-2H-naphtho[2,3-d]triazole-4,9-dione with acetic anhydride and a trace of sulfuric acid.

Example 3.—Naphtho[2,3-c][1,2,5]thiadiazole-4,9-diol diacetate

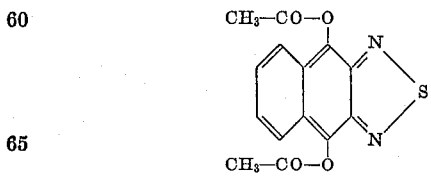

Zinc dust is added to a suspension of 1.15 g. of naphtho[2,3-c][1,2,5]thiadiazole-4,9-dione in 2 g. of acetic anhydride. The product, after crystallization from ethyl acetate and then from nitromethane, melts at 230.5–231.7° C.

I claim:
1. A compound of the formula:

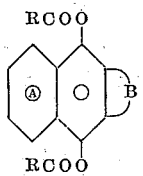

wherein B is a radical selected from the group consisting of

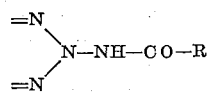

and

and wherein R is lower alkyl.

2. A compound of claim 1 wherein B is the radical

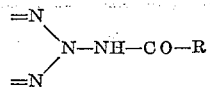

3. A compound of claim 1 wherein B is the radical

4. The compound 2-acetamido-2H-naphtho[2,3-d]-triazole-4,9-diol diacetate.
5. The compound naphtho[2,3-c][1,2,5]thiadiazole-4,9-diol diacetate.

References Cited by the Examiner

Fries et al.: Liebig's Ann. Der Chem., volume 516, pp. 257 and 267-8 (1935).

ALEX MAZEL, *Primary Examiner.*

A. D. ROLLINS, *Assistant Examiner.*